United States Patent
Grant, Jr.

(10) Patent No.: US 9,393,907 B2
(45) Date of Patent: Jul. 19, 2016

(54) GROUP RIDING PROBLEM WARNING SYSTEM

(71) Applicant: Michael Grant, Jr., Bayonne, NJ (US)

(72) Inventor: Michael Grant, Jr., Bayonne, NJ (US)

( * ) Notice: Subject to any disclaimer, the term of this patent is extended or adjusted under 35 U.S.C. 154(b) by 105 days.

(21) Appl. No.: 14/279,920

(22) Filed: May 16, 2014

(65) Prior Publication Data

US 2015/0329038 A1    Nov. 19, 2015

(51) Int. Cl.

| G08G 1/16 | (2006.01) |
|---|---|
| B60Q 9/00 | (2006.01) |
| B60Q 1/26 | (2006.01) |
| B62J 6/00 | (2006.01) |
| G08G 1/00 | (2006.01) |
| B62J 3/00 | (2006.01) |
| B62J 11/00 | (2006.01) |

(52) U.S. Cl.
CPC .. B60Q 9/00 (2013.01); B60Q 1/26 (2013.01); B62J 3/00 (2013.01); B62J 6/00 (2013.01); B62J 11/00 (2013.01); G08G 1/00 (2013.01); *B60Q 2900/30* (2013.01); *B62J 2006/008* (2013.01)

(58) Field of Classification Search
CPC ........................................................ B60Q 1/26
USPC ......... 340/901, 903, 902, 904, 539.1, 539.13, 340/427, 432
See application file for complete search history.

(56) References Cited

U.S. PATENT DOCUMENTS

| 4,257,121 | A | * | 3/1981 | Henderson ........... H04B 1/3833 |
|---|---|---|---|---|
| | | | | 200/293 |
| D316,684 | S | | 5/1991 | Bonadonna |
| 5,477,208 | A | | 12/1995 | Henderson et al. |
| 6,762,678 | B2 | | 7/2004 | Arens |
| 7,109,857 | B2 | | 9/2006 | Ross, Jr. et al. |
| 7,455,419 | B2 | | 11/2008 | Helget et al. |
| 8,169,319 | B2 | | 5/2012 | Kaplan et al. |
| 8,797,182 | B1 | * | 8/2014 | Howe ............................ 340/903 |
| 2005/0200487 | A1 | | 9/2005 | O'Donnell et al. |
| 2006/0290516 | A1 | | 12/2006 | Muehlsteff et al. |
| 2010/0184425 | A1 | * | 7/2010 | Lee et al. ...................... 455/424 |
| 2010/0259360 | A1 | * | 10/2010 | Brown et al. .................. 340/5.2 |
| 2013/0069797 | A1 | * | 3/2013 | Howe ............................ 340/903 |

* cited by examiner

*Primary Examiner* — Brent Swarthout

(57) ABSTRACT

A group riding problem warning system allows an individual participating in a group ride to communicate an indication of a problem to each other rider. The system includes a plurality of warning units. Each warning unit comprises a processor positioned in a housing. A respective transceiver is positioned in each housing and communicatively coupled to the processor. A respective actuator is coupled to each housing and operationally coupled to the processor wherein the transceiver transmits a signal to the warning units upon manipulation of the actuator. A respective indicator is coupled to each housing and operationally coupled to the processor wherein the indicator is activated upon the transceiver receiving the signal transmitted from one of the warning units. Each of a plurality of connectors is coupled to an associated warning unit for coupling to a handlebar such that the indicator is visible to a user.

12 Claims, 4 Drawing Sheets

GROUP RIDING PROBLEM WARNING SYSTEM

BACKGROUND OF THE DISCLOSURE

Field of the Disclosure

The disclosure relates to warning systems and more particularly pertains to a new warning system for allowing an individual participating in a group ride of motorcycles or the like to communicate an indication of a problem to each other rider participating in the group.

SUMMARY OF THE DISCLOSURE

An embodiment of the disclosure meets the needs presented above by generally comprising a plurality of warning units. Each warning unit comprises a processor positioned in a housing. A respective transceiver is positioned in each housing and communicatively coupled to the processor. A respective actuator is coupled to each housing and operationally coupled to the processor wherein the transceiver transmits a signal to the warning units upon manipulation of the actuator. A respective indicator is coupled to each housing and operationally coupled to the processor wherein the indicator is activated upon the transceiver receiving the signal transmitted from one of the warning units. Each of a plurality of connectors is coupled to an associated warning unit for coupling to a handlebar such that the indicator is visible to a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
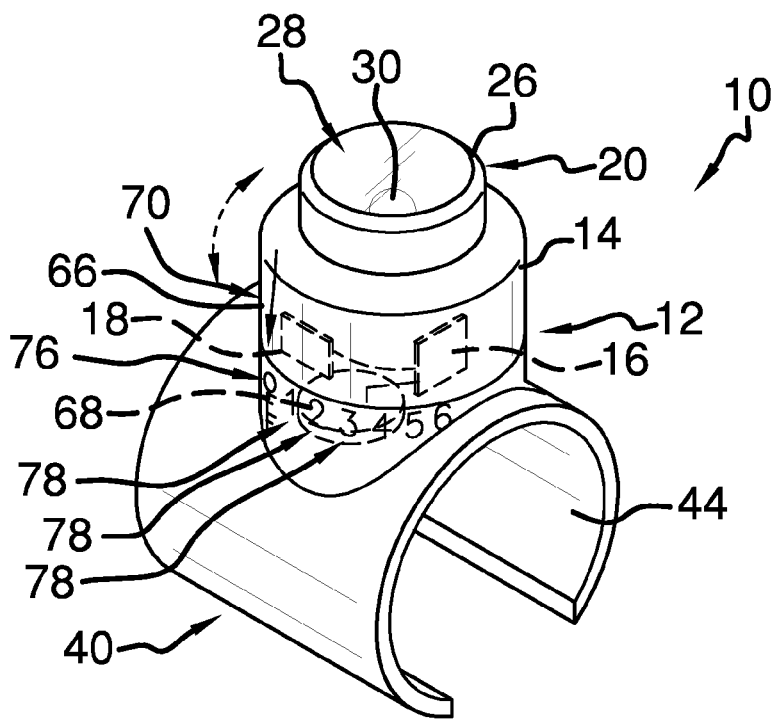
FIG. 1 is a top front side perspective view of a group riding problem warning system according to an embodiment of the disclosure.
Figure 2:
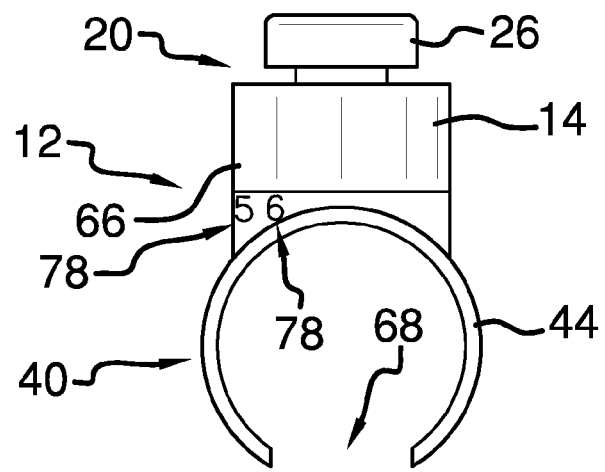
FIG. 2 is a side view of an embodiment of the disclosure.
Figure 3:
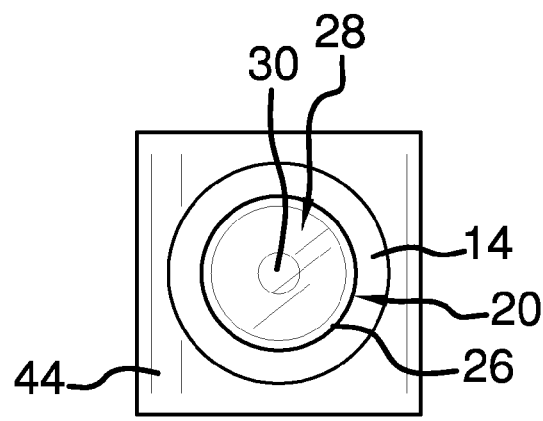
FIG. 3 is a top view of an embodiment of the disclosure.
Figure 4:
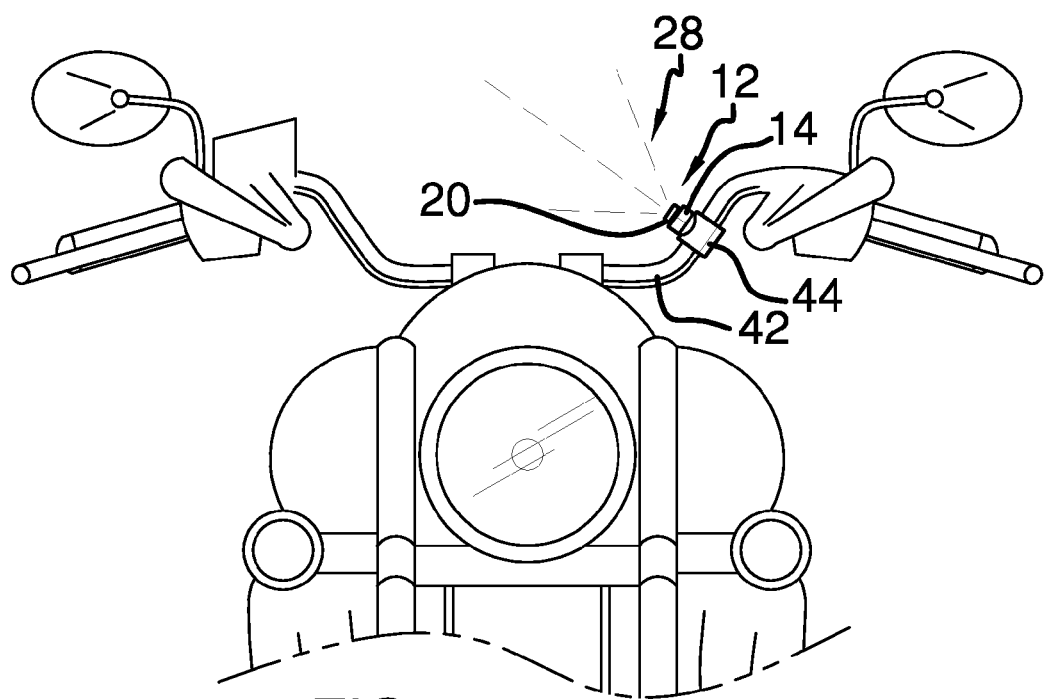
FIG. 4 is a front view of an embodiment of the disclosure in use.

With reference now to the drawings, and in particular to FIGS. 1 through 6 thereof, a new warning system embodying the principles and concepts of an embodiment of the disclosure and generally designated by the reference numeral 10 will be described.

As best illustrated in FIGS. 1 through 6, the group riding problem warning system 10 generally comprises a plurality of warning units 12 provided for intercommunication between a plurality of vehicles such as motorcycles, all terrain vehicles, or the like, typically having handlebars for steering. Such vehicles, particularly motorcycles, are commonly ridden in groups but the nature of the vehicles inhibit clear communication between riders within a group while riding. Each warning unit 12 comprises a housing 14 and a processor 16 positioned in the housing 14. A battery 68 may be provided in the housing 14 and electrically coupled to the processor 16. A transceiver 18 is positioned in the housing 14. The transceiver 18 is communicatively coupled to the processor 16. An actuator 20 is coupled to the housing 14 and is operationally coupled to the processor 16 wherein the transceiver 18 transmits a signal 22 to the warning units 12 distributed amongst the group upon manipulation of the actuator 20. Thus, the system 10 provides for a direct means of communicating trouble experienced by any one of the group to all members of the group through a single action. The actuator 20 is a button 26. The processor 16 activates the transceiver 18 to send the signal 22 upon pressing of the button 26. A respective indicator 28 is coupled to each housing 14. The indicator 28 is operationally coupled to the processor 16 wherein the indicator 28 is activated upon the transceiver 18 receiving the signal 22 transmitted from one of the warning units 12. The indicator 28 is a light 30 illuminated upon the transceiver 18 receiving the signal 22. The signal 22 may be provided through conventional intercommunication means having a suitable range for group riding.

The housing 14 may incorporate a rotatable section 70 defining a dial 66 with indicia 72 marking selectable positions for the dial 66. The dial 66 is operationally coupled to the processor 16 allowing each rider to activate the respective warning unit 12 by turning of the dial 66. Each warning unit 12 may function on a single one of a plurality of radio channels selectable by positioning of the dial 66. Thus, all riders in the group would set the respective dial 66 to the desired channel for a particular ride. Alternatively, each warning unit 12 may have a respective radio channel or frequency allowing for identification of which particular rider is sending the signal 22. The light 30 may be illuminated in a pattern associated with each particular rider such that the specific rider actuating transmission of the signal 22 may be identified by each other rider.

The light 30 is positioned in the button 26 wherein the light 30 illuminates the button 26 when the light 30 is illuminated. A top surface 66 of the button 26 may be translucent or transparent. This provides for a minimal yet noticeable design so as not to take away from the overall appearance of the vehicle. Each warning unit 12 may be reset after actuation of the indicator 28. The button 26 may be operationally coupled to the processor 16 such that holding the button 26 in a pressed position for an extended duration of time such as three or more seconds will deactivate the indicator 28 and reset the warning unit 12. Alternatively, each warning unit 12 may be reset by deactivating each respective warning unit 12 by rotation of the dial 66 to an off position 76 and then reactivating by rotation of the dial 66 to one of a plurality of channel selection positions 78.

Each of a plurality of connectors 40 is coupled to an associated one of the warning units 12 for coupling to a handlebar 42 of a respective vehicle in a group of vehicles such that the indicator 28 is visible to a rider of the respective vehicle. As shown in FIGS. 1 through 4, the connector 40 is a collar 44 coupled to and extending from the housing 12. The collar 44 may be integral to the housing 12 and provided in a chrome finish for a more permanent and integrated connection to the handlebar 42. The collar 44 may be configured to conform to the shape of the handlebar 42 to be positioned at a desired place on the handlebar 42. In a variation shown in FIG. 2, the collar 44 includes a slit 68 allowing the handlebar 42 to be inserted into the collar 44 through the slit 68. Resilience in the collar 44 secures the collar 44 to the handlebar 42.

Figure 5:
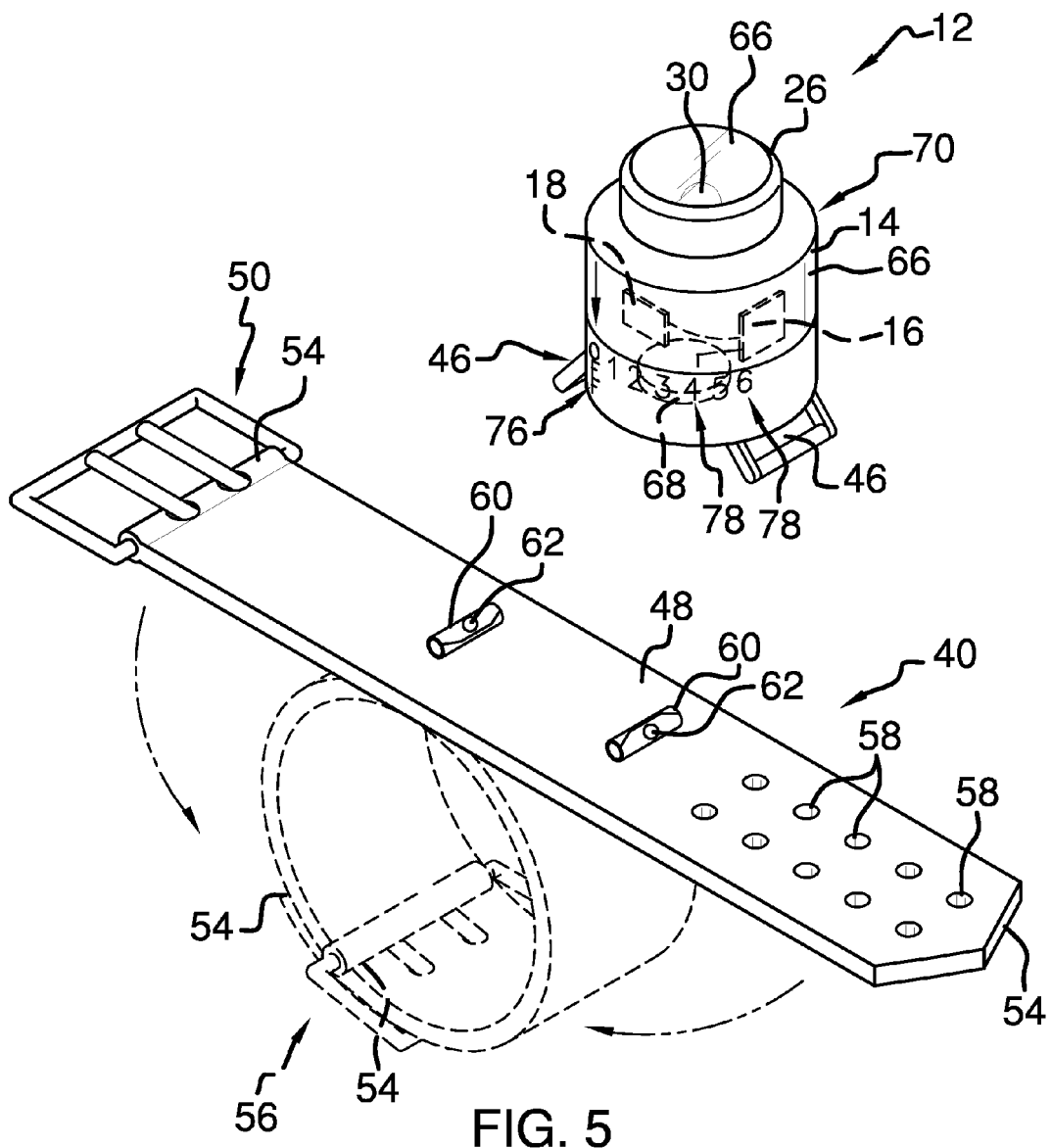
FIG. 5 is a partially exploded top front side perspective view of an embodiment of the disclosure.
Figure 6:
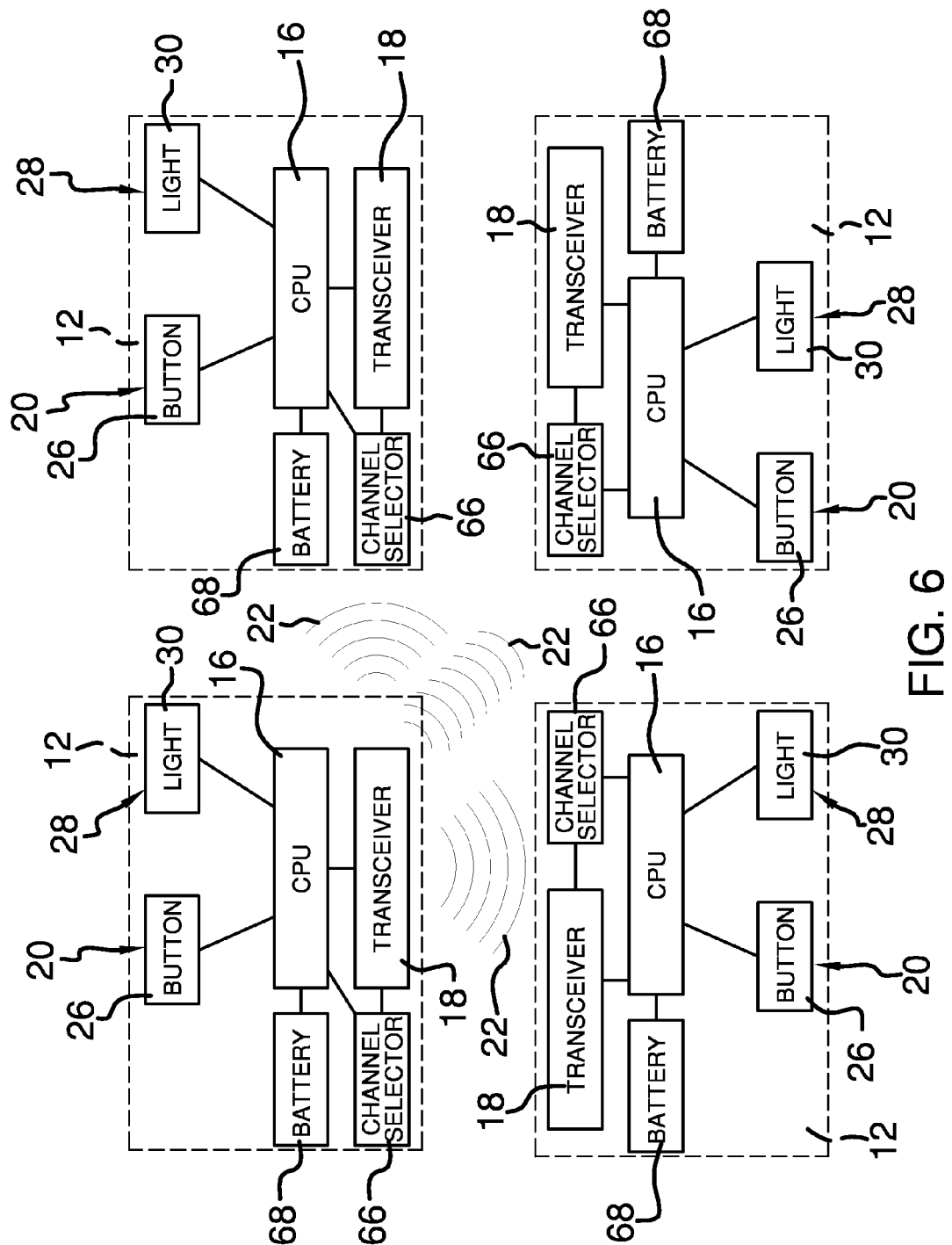
FIG. 6 is a schematic view of an embodiment of the disclosure.

As shown in FIG. 5, the housing 12 may have a pair of slots 46. The connector 40 may comprising a strap 48 couplable to the slots 46. A fastener 50 is coupled to the strap 48. The fastener 50 couples opposed ends 54 of the strap 48 to form a loop 56 wherein the strap 48 is configured for coupling to the handlebar 42 of the vehicle. The fastener 50 may be a buckle and the strap 48 may have a plurality of apertures 58 engageable by the buckle wherein a size of the loop 56 is adjustable. Thus, the strap 48 may be easily installed on, removed from, and positioned on the handlebar 42. Each of a pair of bands 60 is coupled to the strap 48. Each of the bands 60 is insertable through an associated one of the slots 46 wherein the strap 48 is coupled to the housing 12. Snaps 62 are coupled to each of the bands 60 fastening a respective one of the bands 60 to the housing 12 such that each of the bands 60 is removably couplable to the housing 12.

In use, a respective warning unit 12 is attached to each vehicle within a group riding together. If any individual rider experiences difficulty, the button 26 is depressed sending the signal 22. The light 30 of each warning unit 12 is then illuminated so that all riders in the group are aware a stop is required.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A group riding problem warning system comprising:
a plurality of warning units, each warning unit comprising
a housing, said housing having a rotatable section defining a dial, each warning unit operating on a single one of a plurality of radio channels selectable by positioning of said dial,
a processor positioned in said housing,
a transceiver positioned in said housing, said transceiver being communicatively coupled to said processor,
a single actuator coupled to said housing, said single actuator being operationally coupled to said processor wherein said transceiver transmits a signal to said warning units upon manipulation of said single actuator, and
a single indicator coupled to said housing illuminated in a pattern associated with each particular rider such that the specific rider manipulating an actuator may be identified by each other rider, said single indicator being operationally coupled to said processor wherein said single indicator is activated upon said transceiver receiving said signal transmitted from one of said warning units; and
a plurality of connectors, each said connector being coupled to an associated said warning unit, each said connector being configured for coupling to a handlebar of a respective vehicle in a group of vehicles such that said single indicator is visible to a rider of the respective vehicle.

2. The system of claim 1, further comprising said single actuator being a button, said processor activating said transceiver to send said signal upon pressing of said button.

3. The system of claim 1, further comprising said single indicator being a light, said light being illuminated upon said transceiver receiving said signal.

4. The system of claim 2, further comprising said single indicator being a light, said light being illuminated upon said transceiver receiving said signal, said light being positioned in said button wherein said light illuminates said button when said light is illuminated.

5. The system of claim 1, further comprising said connector being a collar coupled to and extending from said housing.

6. The system of claim 1, further comprising:
said housing having a pair of slots;
said connector comprising a strap, said strap being couplable to said slots; and
a fastener coupled to said strap, said fastener coupling opposed ends of said strap to form a loop wherein said strap is configured for coupling to the handlebar of the vehicle.

7. The system of claim 6, further comprising said fastener being a buckle, said strap having a plurality of apertures engageable by said buckle wherein a size of said loop is adjustable.

8. The system of claim 6, further comprising a pair of bands coupled to said strap, each of said bands being insertable through an associated one of said slots wherein said strap is coupled to said housing.

9. The system of claim 8, further comprising snaps coupled to each of said bands, each of said snaps fastening a respective one of said bands to said housing such that each of said bands is removably couplable to said housing.

10. A group riding problem warning system comprising:
a plurality of warning units, each warning unit comprising
a housing, said housing having a rotatable section defining a dial, each warning unit operating on a single one of a plurality of radio channels selectable by positioning of said dial,
a processor positioned in said housing,
a transceiver positioned in said housing, said transceiver being communicatively coupled to said processor,
a single actuator coupled to said housing, said single actuator being operationally coupled to said processor wherein said transceiver transmits a signal to said warning units upon manipulation of said single actuator, said single actuator being a button, said processor activating said transceiver to send said signal upon pressing of said button, and a single indicator coupled to said housing illuminated in a pattern associated with each particular rider such that the specific rider manipulating an actuator may be identified by each other rider, said single indicator being operationally coupled to said processor wherein said single indicator is activated upon said transceiver receiving said signal transmitted from one of said warning units, said single indicator being a light, said light being illuminated upon said transceiver receiving said signal, said light being positioned in said button wherein said light illuminates said button when said light is illuminated; and a plurality of connectors, each said connector being coupled to an associated said warning unit, each said connector being configured for coupling to a handlebar of a respective vehicle in a group of vehicles such that said indicator is visible to a rider of the respective vehicle.

11. The system of claim 10, further comprising said connector being a collar coupled to and extending from said housing.

12. The system of claim 10, further comprising:

said housing having a pair of slots;

said connector comprising a strap, said strap being couplable to said slots;

a fastener coupled to said strap, said fastener coupling opposed ends of said strap to form a loop wherein said strap is configured for coupling to the handlebar of the vehicle, said fastener being a buckle, said strap having a plurality of apertures engageable by said buckle wherein a size of said loop is adjustable;

a pair of bands coupled to said strap, each of said bands being insertable through an associated one of said slots wherein said strap is coupled to said housing; and snaps coupled to each of said bands, each of said snaps fastening a respective one of said bands to said housing such that each of said bands is removably couplable to said housing.

* * * * *